(No Model.)
W. MONTGOMERY.
HAMMER.
No. 459,643. Patented Sept. 15, 1891.
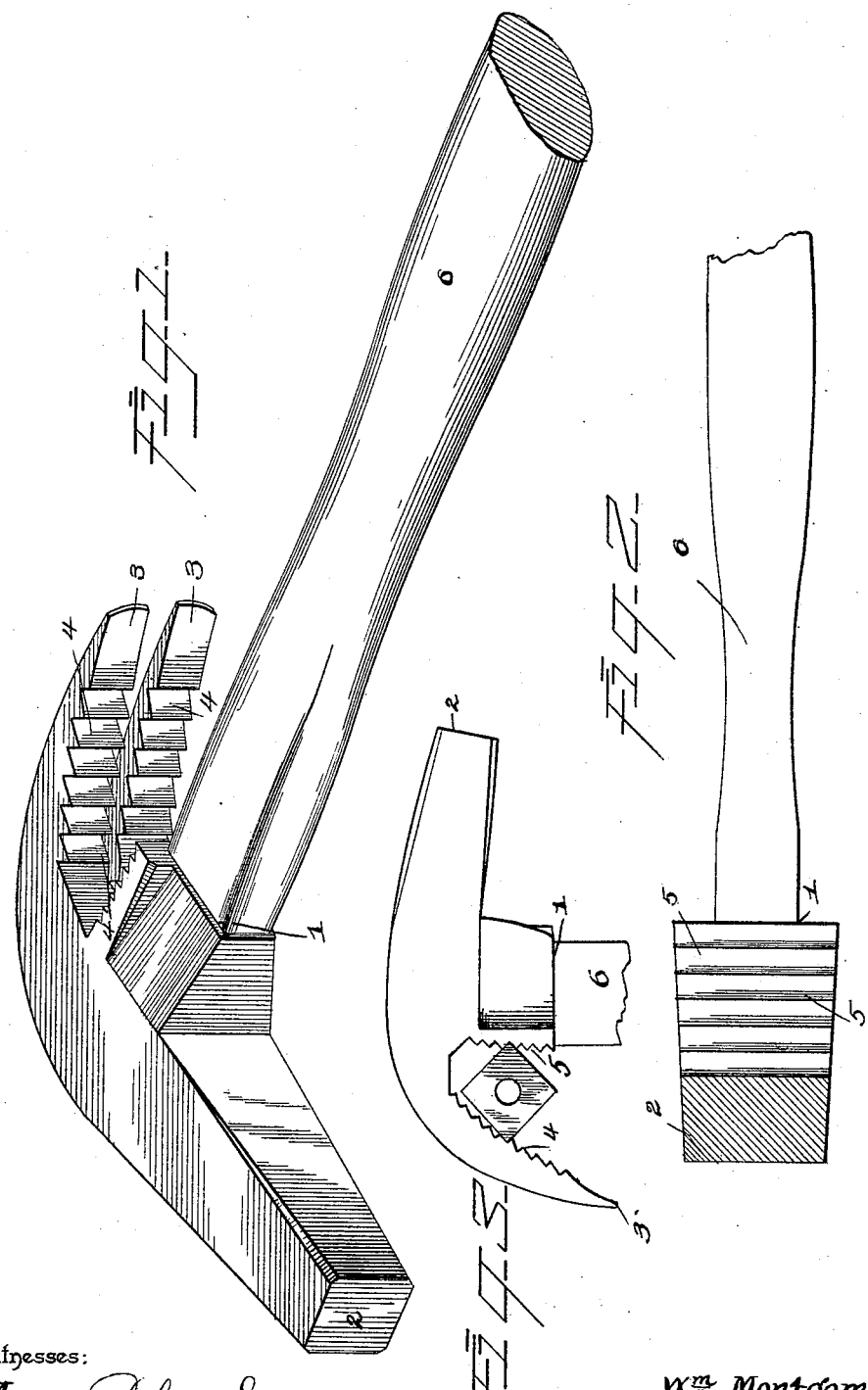
Witnesses:
Isaac Behreads.
W. S. Duval.
By his Attorneys,
C. A. Snow & Co.
Inventor
Wm Montgomery

UNITED STATES PATENT OFFICE.

WILLIAM MONTGOMERY, OF ROSEVILLE, ILLINOIS, ASSIGNOR OF ONE-HALF TO ALEXANDER KRIEG, OF SAME PLACE.

HAMMER.

SPECIFICATION forming part of Letters Patent No. 459,643, dated September 15, 1891.

Application filed February 20, 1891. Serial No. 382,193. (No model.)

*To all whom it may concern:*

Be it known that I, WILLIAM MONTGOMERY, a citizen of the United States, residing at Roseville, in the county of Warren and State of Illinois, have invented a new and useful Hammer, of which the following is a specification.

This invention relates to improvements in hammers; and the object in view is to provide a hammer with means for gripping a tight rod or nut for the purpose of turning the same, or, in other words, a combined hammer and wrench.

With the above object in view the invention consists in certain features of construction hereinafter specified, and particularly pointed out in the claims.

Referring to the drawings, Figure 1 is a perspective of a hammer constructed in accordance with my invention. Fig. 2 is a transverse section looking toward the eye. Fig. 3 is a plan view of the hammer, showing the claw adjusted on a nut.

Like numerals of reference indicate like parts in all the figures of the drawings.

In practicing my invention I construct a head, the same consisting of a handle-receiving eye 1, at one side of which extends the hammer-face 2 and at the opposite side thereof of the claw 3. The claw 3 is provided upon its inner side with inwardly-disposed teeth 4, and the eye at that side thereof adjacent to the claw is provided with a square or flat surface, which is also provided with a series of transverse teeth 5, disposed oppositely to those of the claw. The handle 6 having been supplied, the hammer may be used as such for driving nails, tacks, brads, &c., and the claw thereof may be inserted under the head of the nails for the purpose of withdrawing the same, as in the ordinary manner. By introducing the claw over a rod, pipe, nut, or bolt and drawing the same snugly thereon the teeth will grip or bind upon such object, and by swinging the hammer, by exerting strength upon the handle, which is used as a leverage, such objects may be rotated, and thus a nut removed, a pipe unscrewed, or a rod twisted, all as will be readily understood, and as commonly performed by wrenches. By widening one side of the eye to form a plate having transverse ratchet-teeth a much firmer grip may be obtained upon the object than where merely the claw is toothed and all slipping positively avoided.

Having described my invention, what I claim is—

1. The hammer-head consisting of the handle-receiving eye, a hammer-face located at one side of the eye and claws at the opposite side and adapted to serve as a wrench-jaw, said eye having that surface adjacent to the claws squared to form a flat surface adapted to serve as a companion wrench-jaw, substantially as specified.

2. The hammer-head consisting of the handle-receiving eye, a hammer-face located at one side of the eye and claws at the opposite side, said eye having that surface adjacent to the claws squared to form a flat surface and provided with teeth disposed away from the head, and the claw provided upon its under surface with teeth disposed toward the head, substantially as specified.

In testimony that I claim the foregoing as my own I have hereto affixed my signature in presence of two witnesses.

WILLIAM MONTGOMERY.

Witnesses:
J. H. RANKIN,
S. M. MCLAUGHLIN.